United States Patent [19]

Thompson et al.

[11] 4,330,898
[45] May 25, 1982

[54] ATTACHMENT MEANS

[75] Inventors: Robert L. Thompson, Doncaster; Douglas E. Scotcher, Elwood, both of Australia

[73] Assignee: Nu-View Pty. Ltd., Fitzroy, Australia

[21] Appl. No.: 212,437

[22] Filed: Dec. 3, 1980

[30] Foreign Application Priority Data

Dec. 5, 1979 [AU] Australia ............... PE1618

[51] Int. Cl.³ .............................................. B60S 1/40
[52] U.S. Cl. ................................. 15/250.32; 403/2; 403/119
[58] Field of Search ........... 15/250.31, 250.32, 250.42; 403/2, 119, 321–324, 317

[56] References Cited

U.S. PATENT DOCUMENTS 3,641,614  2/1972  Newsome ................. 15/250.32
3,823,436  7/1974  Roberts ................... 15/250.32
4,209,874  7/1980  Hancu ..................... 15/250.32

Primary Examiner—Peter Feldman
Attorney, Agent, or Firm—Fleit & Jacobson

[57] ABSTRACT

A coupling element to releasably secure a windscreen wiper blade to a wiper arm which has a coupling pin extending transversely therefrom comprises a body to engage between side walls of the wiper blade with pivot lugs on the body seating in pivot seats in the side walls to enable the body to pivot thereabout. The body is formed with a transverse passageway which aligns with apertures in the side walls and through which the coupling pin engages when the body is in a first position. The passageway is formed so that the body is pivotable from the first position to a second position whereat a latching element on the coupling pin engages with the body to prevent lateral withdrawal of the pin from the body.

12 Claims, 6 Drawing Figures

U.S. Patent
May 25, 1982
4,330,898
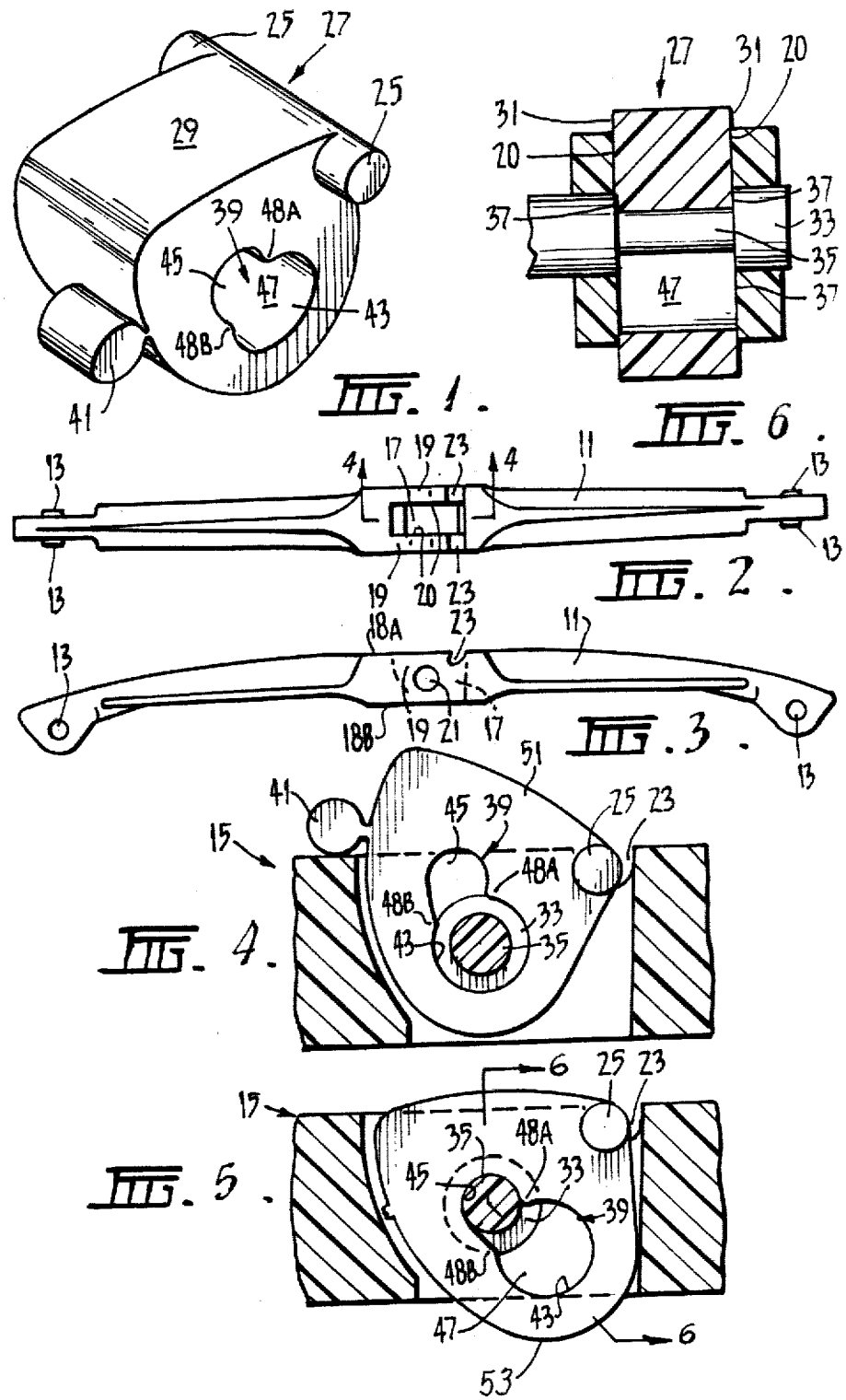

ATTACHMENT MEANS

BACKGROUND OF THE INVENTION

The present invention relates to attachment of windscreen wiper blades to windscreen wiper arms. More specifically the present invention relates to attachment of a wiper blade to a wiper arm by means of a pin which extends from the wiper arm, the pin extending generally transversely to the direction of extension of the wiper arm. The wiper blade has an aperture therethrough in a direction generally perpendicular to the longitudinal extent of the wiper blade and the pin is inserted into the aperture so that the blade is attached to the wiper arm in a manner enabling at least a limited rotation of the wiper blade about the pin. The present invention relates particularly to the means by which the pin is attached or secured in the wiper blade aperture.

In the prior art numerous arrangements have been utilized for securing the pin within the wiper blade aperture. Australian Pat. No. 261,354 to Trico Products Corporation discloses a wiper arm having a channel shaped member having side portions through which a transverse pin passes from a wiper arm clip. The clip is releasably mounted to a wiper arm but the pin is permanently secured to the wiper blade and the clip.

Australian Pat. No. 406,236 to Trico Products Corp. discloses an arm and wiper blade assembly wherein a connector pin, fixed to the arm, has a reduced diameter center portion and the pin engages aligned apertures in side walls of the wiper blade. A receptor comprising a tubular member and a coiled spring are arranged to engage with the reduced diameter portion of the pin to prevent removal of the wiper blade therefrom.

Australian Pat. No. 420,822 to Trico Products Corp. discloses the use of a leaf spring to engage a reduced diameter portion of the pin to retain the pin and wiper arm engagement.

Australian Pat. No. 433,044 to Trico Products Corp. discloses an arrangement of coil spring and tubular member similar to that of Australian Pat. No. 406,236. Australian Pat. No. 439,186 to Trico-Folberth Limited discloses modified arrangements of the leaf-spring latching and coil spring latching similar to those of the Australian Pat. Nos. 406,236 and 420,822.

Australian Pat. No. 468,102 to The Anderson Company shows further modified latching arrangements using a leaf spring engaging a reduced diameter portion of the pin.

Australian Patent Application No. 54603/73 of Robert Bosch (Australia) Pty. Ltd. discloses another form of latching arrangement having a spring biased slide in the wiper blade which is movable under the spring bias to engage the reduced diameter portion of the pin to secure the pin in the wiper blade.

As is shown in the prior art arrangements, the pin is usually provided with a reduced diameter portion (otherwise described as a recess or channel) having shoulders on each side thereof. The pin has, in the past, been secured within the wiper blade aperture by location of biasable latching elements, coil springs or other insertable members into the reduced diameter portion of the pin. These prior art arrangements are disadvantageous in that use of an auxiliary tool such as a screwdriver is required for attachment or disassembly or in that a plurality of parts need to be assembled and secured together prior to insertion of the pin into the aperture.

It would therefore be desirable to provide a new arrangement whereby a single element can be used to releasably secure a wiper blade to a wiper arm and which preferably enables ready attachment and disassembly without requiring use of any tools.

SUMMARY OF THE INVENTION

Briefly, the present invention comprises a windscreen wiper blade, and a coupling element for attaching the wiper blade to a wiper arm which has a coupling pin extending laterally therefrom, the coupling pin having at least one latching element, said wiper blade having a pair of opposed side walls with an aperture in at least one side wall to receive the coupling pin, said coupling element including a body proportioned to be received between said side walls, hinge means to cooperate with associated hinge means on the wiper blade to enable the body to be pivoted relative to the wiper blade, said body having a passageway therethrough which is aligned with the aperture in said at least one side wall, said passageway being dimensioned to receive said coupling pin inserted through said aperture when the body is in a first pivot position and the passageway being shaped so that the body is pivotable to a second pivot position whereat said latching element of said coupling pin cooperates with said body to secure the coupling pin within the body.

In one form the windscreen wiper blade and coupling element is designed for attachment of the wiper blade to a coupling pin having a reduced diameter central portion with a shoulder on each side thereof.

The wiper blade attachment portion has a channel with sides having aligned apertures for receiving the pin, at least one of the sides having a seat for receiving a pivot pin or the like therein in a manner such that the pivot pin may be rotated in said seat.

The coupling element has a body proportioned to be received within the channel with at least one pivot pin adapted to be received in the seat thereby enabling said body to be rotated about the pivot pin between first and second positions. The body has a passage therethrough shaped such that, when the body is in the first position the passage aligns with the apertures and is dimensioned to enable the coupling pin to be inserted therethrough to a position whereat the reduced central portion extends therethrough, the passage being further shaped such that the body may be moved from the first position to the second position whereat at least a portion of the body lies between the shoulders on the coupling pin thereby preventing the coupling pin from being withdrawn.

In still another aspect of the present invention there is provided the combination of the windscreen wiper blade having an attachment portion and an attachment means, said combination enabling said wiper blade to be attached to a wiper arm, said wiper arm having a laterally extending coupling pin having a reduced central portion with a shoulder on each side thereof, said wiper blade attachment portion having a channel with sides having aligned apertures for receiving said pin, at least one of said sides having a seat therein, said attachement means including a body proportioned to be received within said channel and at least one hinge lug adapted to be received in said seat thereby enabling said body to be rotated within said seat between first and second positions, said body having a passage therethrough shaped such that, when said body is in said first position said passage aligns with said apertures and is dimensioned to enable said coupling pin to be inserted therethrough to a position whereat said reduced central portion extends therethrough, said passage being further shaped such that said body may be moved from said first position to said second position whereat at least a portion of said body lies between said shoulders thereby preventing said pin from being withdrawn.

Preferably when the body is in the first position, the coupling pin is inserted therethrough to a position whereat not only does the reduced central portion extend therethrough but also the shoulders on the coupling pin lie externally adjacent respective sides of said body, which are preferably parallel.

In one embodiment of the invention the inside surfaces of the sides of the wiper blade channel portion are substantially parallel and the body has correspondingly spaced substantially parallel side faces whereby when the body is received within the channel a close frictional abutment of said faces with the inside surfaces is achieved.

In the preferred embodiment of the invention the body is provided with a frangible member which permits the body to be located in said first position and which frangible member must be broken away to enable the body to be pivoted from said first to said second position.

Preferably each of the side walls of the wiper blade has a seat to receive a hinge lug or pivot pin on the body.

The passage in said body may comprise co-extending cylindrical passage portions which extend in substantially the same direction as said aligned apertures in the side walls, the first of said cylindrical passage portions being of sufficient diameter to enable the coupling pin shoulders to be inserted therethrough, and the second of said cylindrical passages being of a lesser diameter sufficient to receive the central reduced diameter portion of the coupling pin but which prevents the shoulders thereon passing therethrough, the said first and second cylindrical portions being co-joined along their length by a longitudinal opening enabling the body to be rotated from the first to the second positions by allowing the central portion of the pin to pass from said first passage portion through said longitudinal opening and into said second passage portion.

Preferably the diameter of said first passage portion substantially corresponds to the diameter of said coupling pin shoulders and the diameter of said second passage portion substantially corresponds to the diameter of the central reduced diameter portion of the coupling pin.

The longitudinal opening preferably has a width less than the diameter of either said first or second passages whereby said rotation from the said first to said second positions achieves an interference locking fit of said central pin portion into said second passage position.

In the preferred embodiments, the body is proportioned such that when located in said first position a portion thereof protrudes above the sides of said wiper blade and when located in said second position a portion thereof protrudes below the sides of the wiper blade so that the body may be readily moved between said first and second positions by depressing the portions thereof protruding above or below the sides.

The invention will be more readily apparent to one skilled in the art from the following description of a preferred embodiment which is described with reference to the accompanying drawings.

BRIEF DESCRIPTION OF THE DRAWINGS

FIG. 1 is a perspective view of a coupling element in accordance with the present invention, FIG. 2 is a plan view of a windscreen wiper blade incorporating features of the invention, FIG. 3 is a side view of the windscreen wiper blade of FIG. 2, FIG. 4 is a cross-sectional view taken along line 4—4 in FIG. 2 and showing a windscreen wiper arm pin inserted through the coupling element of FIG. 1 engaged with the wiper blade, FIG. 5 is a cross-sectional side view similar to FIG. 4 showing the coupling element in a latching position, and FIG. 6 is a sectional view along lines 6—6 of FIG. 5, showing the configuration of the windscreen wiper arm pin and the location of the body of the coupling element between the pin shoulders when the body is in the second position.

DESCRIPTION OF ILLUSTRATED EMBODIMENT

Referring to the drawings, there is shown, in FIGS. 2 and 3, a windscreen wiper blade 11. This wiper blade 11 includes a primary yoke or pressure distributing bridge member which is connected in a manner well known in this art, by lugs 13 to secondary bridge members (not shown) which are in turn connected to a wiper blade rubber. Wiper blade 11 has an attachment portion 15 having a channel 17 extending therethrough from an upper external surface 18A to a lower external surface 18B as seen in FIG. 3. Attachment portion 15 is formed such that substantially parallel sides 19 define the channel 17. Each side 19 has an aperture 21 extending therethrough, the two apertures 21 being aligned. Each side 19 is also formed with a seat 23. Seat 23 is an open-sided recess shaped to receive a hinge lug 25 of the coupling element 27 shown in FIG. 1, such that each lug 25 may be rotated in its respective seat 23.

Referring now to FIG. 1 there is shown a coupling element 27 comprising a body 29 having aligned hinge lugs 25 protruding from each side thereof. Body 29 is formed with substantially parallel side faces 31 and a passage 39 extends between the faces 31. As is clear from FIG. 6 the distance between side faces 31 and the corresponding distance between the inside surfaces 20 is substantially the same so that insertion of body 29 between sides 19 achieves a close frictional engagement, thereby enabling the coupling element 27 to be securely and firmly located within channel 17.

A wiper arm (not shown) which is of a type well known in this art, is provided with a coupling pin 33 which extends therefrom in a direction generally transverse to the direction of extension of the wiper arm. As shown in FIG. 6 pin 33 has a reduced diameter central portion 35. Central portion 35 is therefore bounded by shoulders 37 on each side thereof, shoulders 37 being spaced apart a distance which is equal to or slightly greater than the distance between side faces 31 of the coupling element 27.

As can be clearly seen from FIGS. 1, 4 and 5, passage 39 in the coupling element 27 comprises two coextending cylindrical passage portions 43 and 45. The larger passage portion 43 is of sufficient diameter to allow coupling pin shoulders 37 to pass therethrough. The smaller passage portion 45 is of sufficient diameter to engage over the central pin portion 35 but prevents shoulders 37 from being withdrawn therefrom i.e. from being moved either to the left or to the right relative to FIG. 6.

The wiper blade 11 is attached to pin 33 by inserting pin 33 into the aligned apertures 21, and through the passage 39 in the coupling element 27 when the passage portion 43 is aligned with the apertures 21.

Referring to FIGS. 4 and 5, attachment is achieved by locating coupling element 27 in a first position whereat the hinge lugs are engaged with the seats 23 and the passage portion 43 is suitably aligned with the apertures 21. The pin 33 is inserted to a position whereat shoulders 37 lie externally adjacent each side of body 29 and pin central portion 35 extends through body 29.

The coupling element 27 is then rotated about the axis of the hinge lugs 25 in seats 23 from the first position shown in FIG. 4 to a second position shown in FIG. 5. Passage 39 is shaped so as to permit this movement while at the same time ensuring that a portion of the body 29 is introduced in between shoulders 37 thereby preventing pin 33 from being withdrawn. In other words, as seen in FIG. 6, body side faces 31 lie between and, in the embodiment shown, closely abut shoulders 37 thus securing pin 33 to wiper blade 11. As can be seen by reference to FIG. 6, the securement of pin 33 by coupling element 27 is achieved relative to withdrawal of pin 33 from aperture 21 and passage 39 in either direction i.e. pin 33 is prevented from moving to the left or to the right relative to FIG. 6.

At the same time at least limited rotational movement of the wiper blade 11 is permitted. This relative movement is necessary where the wiper blade and arm assembly is used to wipe curved windscreens which require such relative movement.

The coupling element 27 is provided with a frangible member 41 which is positioned so as to allow the coupling element 27 to be located in the first position shown in FIG. 4 whereat frangible member 41 abuts the upper external surface 18A of attachment portion 15. Thus the coupling element 27 may be readily positioned in the first position whereat passage 39 aligns with apertures 21, by simply locating hinge lugs 25 in seats 23 and by abutting frangible member 41 with surface 18A. This relative positioning is then maintained by the frictional abutments of surfaces 20 with faces 31. Subsequently, when pin 33 has been appropriately positioned by insertion into apertures 21 and passage 39, the coupling element 27 is moved from the first position to the second position by being moved downwardly relative to FIG. 4 thereby breaking frangible member 41 away from the body.

As is seen in FIG. 1, the passage portions 43 and 45 are co-joined by a longitudinal opening 47 extending in the same direction as passage 39 i.e. extending between body side faces 31. Opening 47 has sufficient width to permit the body 29 to be rotated between the first and second positions by allowing central portion 35 of the coupling pin to pass therethrough with slight interference. However, as the width of opening 47 is slightly less than the diameter of central portion 35 i.e. opening 47 being defined by a pair of opposed protrusions 48A and 48B which extend along the length of passage 39 to form a neck between passage portions 43 and 45 and consequently rotation between the first and second positions requires engagement of protrusions 48A and 48B with coupling pin central portion 35, resilient expansion of opening 47 is required to enable central portion 35 to pass therethrough. Thus the movement of the body from the first to second position requires a sufficient force to achieve this expansion of opening 47. The engagement of protrusions 48A and 48B with pin central portion 35 is such as to ensure that coupling element 27 is moved to either said first or second positions but does not remain therebetween and thus tends to lock in either the first or second position. As above described this interference fit effectively locks the coupling element 27 into either of the first or second positions and ensures that when attachment of the wiper blade 11 to pin 33 is achieved by location of coupling element 27 into the second position, the coupling element 27 is locked in the second position and consequently the wiper blade is securely attached to the wiper arm. Additionally the frictional abutment of faces 31 with surfaces 20 also aids in holding the coupling element 27 in position.

Referring once again to FIGS. 4 and 5 it can be seen that body 29 is shaped so that a portion 51 protrudes above the channel 17 when the coupling element 27 is located in the first position and so that a portion 53 protrudes below the channel 17 when in the second position. Consequently, the coupling element 27 may be readily moved between the first and second positions (i.e. enabling ready attachment and disassembly of a wiper blade to the wiper arm) by means of depressing the portions 51 or 53 protruding respectively above or below channel 17. Such depressive movements may be affected by hand and do not require the use of an additional tool.

The configuration of attachment portion 15 and cooperating coupling element 27 has been specifically formulated so that these parts may readily be moulded by known plastics moulding techniques and consequently these parts may be mass produced at relatively low cost.

What is claimed is:

1. A windscreen wiper blade, and a coupling element for attaching the wiper blade to a wiper arm which has a coupling pin extending laterally therefrom, the coupling pin having at least one latching element, said wiper blade having a pair of opposed side walls defining a channel and an aperture in at least one side wall receiving therethrough the coupling pin, the aperture being encompassed within the at least one side wall and having a size substantially equal to the exterior circumference of the coupling pin received therethrough, said coupling element including a body proportioned to be received in said channel between said side walls, hinge means cooperating with associated hinge means on the wiper blade for enabling the body to be pivoted relative to the wiper blade, said body having a passageway encompassed therein and extending therethrough which is aligned with the aperture in said at least one side wall, said passageway receiving said coupling pin inserted through said aperture when the body is in a first pivot position and the passageway being shaped so that the body is pivotable to a second pivot position whereat said latching element of said coupling pin cooperates with said body to secure the coupling pin within the body.

2. A combination according to claim 1 wherein each opposed side wall of the wiper blade has aligned apertures to receive the coupling pin.

3. A combination according to claim 1 wherein the hinge means on the wiper blade comprises a hinge recess in at least one side wall and the cooperating hinge means on the coupling element comprises a hinge lug extending therefrom in a direction substantially parallel to said passageway, the hinge lug being engageable in the said recess.

4. A combination according to claim 3 wherein a hinge recess is formed in both side walls and the coupling element has two oppositely extending hinge lugs to engage in the respective hinge recesses.

5. A combination according to claim 1 wherein said latching element comprises a shoulder formed by a reduced diameter portion of said coupling pin.

6. A combination according to claim 5 wherein said reduced diameter portion of said pin defines two opposed shoulders the distance between the shoulders being equal to or greater than the distance between said side walls of the wiper blade.

7. A combination according to claim 5 wherein said passageway comprises two co-joining part cylindrical passages defining therebetween protrusions which are spaced apart a distance less than the reduced diameter of said coupling pin, a larger one of said part cylindrical passages being substantially co-axial with said aperture in said at least one side wall when the body is in the said first pivot position and the other of said part cylindrical passages being substantially co-axial with said aperture in said at least one side wall when the body is in the said second pivot position.

8. A combination according to claim 7 wherein the diameter of the larger of said passages is greater than the largest diameter of the portion of the coupling pin received by the passageway and the diameter of the smaller of the said part cylindrical passages is substantially equal to the reduced diameter portion of the coupling pin.

9. A combination according to claim 7 wherein said shoulder engages with one wall of the body when the body is in said second pivot position to prevent disengagement of the coupling pin from the body.

10. A combination according to claim 1 wherein said body includes a frangible member located in a position whereby when the hinge means are in a cooperative position and the frangible member is in engagement with a top surface of the wiper blade, the passageway is aligned with the aperture in the at least one side wall to receive the coupling pin.

11. A combination according to claim 1 wherein the body is shaped so that a portion thereof projects above the side walls when the body is in the first pivot position and a second portion thereof projects below the side walls when the body is in the second pivot position.

12. A combination according to claim 1 wherein said opposed side walls of said wiper blade are substantially parallel and said body has substantially parallel sides which are an interference fit between said side walls.

* * * * *